US011894877B2

United States Patent
Kaplan

(10) Patent No.: US 11,894,877 B2
(45) Date of Patent: Feb. 6, 2024

(54) RECONFIGURABLE PROCESSING DEVICE FOR QUANTUM COMMUNICATIONS

(71) Applicant: Société VERIQLOUD, Montrouge (FR)

(72) Inventor: Marc Kaplan, Montrouge (FR)

(73) Assignee: VERIQLOUD, Montrouge (FR)

( * ) Notice: Subject to any disclaimer, the term of this patent is extended or adjusted under 35 U.S.C. 154(b) by 685 days.

(21) Appl. No.: 17/041,239

(22) PCT Filed: Apr. 8, 2019

(86) PCT No.: PCT/FR2019/050814
§ 371 (c)(1),
(2) Date: Sep. 24, 2020

(87) PCT Pub. No.: WO2019/207228
PCT Pub. Date: Oct. 31, 2019

(65) Prior Publication Data
US 2021/0058162 A1    Feb. 25, 2021

(30) Foreign Application Priority Data

Apr. 24, 2018   (FR) .................................... 1853595

(51) Int. Cl.
*H04B 10/00* (2013.01)
*H04B 10/70* (2013.01)
*H04J 14/00* (2006.01)

(52) U.S. Cl.
CPC .................................. *H04B 10/70* (2013.01)

(58) Field of Classification Search
CPC ..................................................... H04B 10/70
See application file for complete search history.

(56) References Cited

U.S. PATENT DOCUMENTS 6,718,080 B2 * 4/2004 Ofek ................... H04L 49/3063
385/15
2016/0261361 A1 * 9/2016 Nagarajan ........ H04B 10/07955

FOREIGN PATENT DOCUMENTS

WO         9510907 A1    4/1995
WO      2012044149 A1    4/2012

OTHER PUBLICATIONS

International Search Report for corresponding application PCT/FR2019/050814 filed Oct. 31, 2019; dated Jul. 9, 2019.

* cited by examiner

*Primary Examiner* — Daniel G Dobson
(74) *Attorney, Agent, or Firm* — CANTOR COLBURN LLP

(57) ABSTRACT

The invention relates to a processing device (1) comprising: —an input interface (2) receiving photons having first quantum states, —an encoder (3) generating a photon having a first fixed quantum state from a received electrical signal, —a transformer (4) transforming the first quantum state of a photon into a second quantum state, —a decoder (5) transforming the second quantum state of a photon into an electrical signal, —an output interface (6) delivering photons which have second quantum states and are intended for transmission, —and a switch (7) comprising three inputs connected respectively to the outputs of the input interface (2), encoder (3) and transformer (4), and three outputs connected respectively to the inputs of the output interface (6), decoder (5) and transformer (4), said switch selectively coupling at least one of its inputs to one of its outputs, depending on a received command.

14 Claims, 2 Drawing Sheets

RECONFIGURABLE PROCESSING DEVICE FOR QUANTUM COMMUNICATIONS

TECHNICAL FIELD

The invention relates to the devices which are responsible for processing photons and electrical signals during quantum communications.

STATE OF THE ART

As the person skilled in the art knows, quantum communications are communications in which photons are used to transfer quantum information from an item of electronic equipment to at least one other item of electronic equipment. In such a transfer, each photon is placed in a quantum state which corresponds to a quantum information unit (or "qubit"), denoted $|0\rangle$ or $|1\rangle$, or to a superimposition of two different quantum information units, such as for example $1/\sqrt{2}(|0\rangle+|1\rangle)$ or $1/\sqrt{2}(|0\rangle-|1\rangle)$. In other words, communication entails encoding the quantum information in the quantum properties of the photons, and therefore quantum information corresponds to a degree of freedom of a physical property described by quantum mechanics. Quantum properties of the photons that can be used for quantum communications that can notably be cited include phase, temporal location, polarization and frequency.

Quantum communications can comprise one or more typical procedures, and the procedures that can notably be cited include a procedure of "prepare and measure" type, a procedure of "prepare and send" type, a procedure of "receive and measure" type, and a procedure of "receive and send" type.

The procedure of "prepare and measure" type consists in generating (or creating), from an electrical signal, at least one photon having a first fixed quantum state, then in transforming this first quantum state into a second quantum state (possibly equal to the first) defining a quantum information unit from another electrical signal, then in measuring this second quantum state (to determine the quantum information transferred). This procedure generally makes it possible to exploit the chance inherent in quantum measurement in order to create sequences of random numbers. The implementation of such a procedure requires a first processing device comprising an encoder generating a photon having a first fixed quantum state (dependent on the hardware used) from a received electrical signal, a transformer transforming the first quantum state of a photon into a second quantum state, and a decoder transforming the second quantum state of a received photon into an electrical signal that can be used by equipment (remote or not).

The procedure of "prepare and send" type consists in generating, from an electrical signal, a photon having a first quantum state fixed by the hardware used, then in transforming, from an electrical signal, this first quantum state into a second quantum state (possibly equal to the first) defining a quantum information unit, then in transmitting the photon having this second quantum state over a quantum communication channel. It will be noted that the subdivision into the generation of a photon and the state transformation is a technical constraint that is imposed in order to obtain universality. This procedure can, for example, be used to transmit the information necessary to the creation of a key shared with at least one remote equipment item. The implementation of such a procedure requires a second processing device comprising the abovementioned encoder and transformer and an output interface delivering the photons having second quantum states to be transmitted.

The procedure of "receive and measure" type consists in receiving a photon having a first quantum state, then in transforming this first quantum state into a second quantum state (possibly equal to the first) defining a quantum information unit, then in measuring this second quantum state (to determine the quantum information transferred). This procedure can, for example, be used to receive the information necessary to create a key shared with a remote equipment item. The implementation of such a procedure requires a third processing device comprising an input interface receiving photons having first quantum states, and the abovementioned transformer and decoder.

The procedure of "receive and send" type consists in receiving a photon having a first quantum state, then in transforming this first quantum state into a second quantum state (possibly equal to the first) defining a quantum information unit, then in transmitting the photon having this second quantum state over a quantum communication channel. This procedure can, for example, be used by advanced quantum cryptography protocols, for example when several consecutive round trips between equipment items are necessary or when there are more than two participating equipment items. The implementation of such a procedure requires a fourth processing device comprising the abovementioned input interfaces, transformers and output interfaces.

Currently, one equipment item is generally involved in Just one of the procedures described above, and therefore cannot be involved in the other procedures. Sometimes, when one equipment item has to be involved in two of the abovementioned procedures, it has to comprise, in parallel, two different processing devices adapted respectively to these two procedures, which is not only costly but also bulky, and requires a complex microcontroller. There is no equipment item involved in all four of the abovementioned procedures.

SUMMARY OF THE INVENTION

The aim of the invention is notably to improve the situation.

It notably proposes, to this end, a processing device comprising:
- an input interface configured to receive photons having first quantum states,
- an encoder configured to generate a photon having a first fixed quantum state (dependent on the hardware used) from a received electrical signal,
- a transformer configured to transform the first quantum state of a photon into a second quantum state,
- a decoder configured to transform the second quantum state of a received photon into an electrical signal, and
- an output interface configured to deliver photons having second quantum states and to be transmitted.

This processing device is characterized in that it also comprises a switch comprising at least three inputs respectively connected to outputs of these input interface, encoder and transformer, and at least three outputs respectively connected to inputs of these output interface, decoder and transformer, and selectively coupling at least one of its inputs to one of its outputs according to a received command.

Thus, there is a single processing device which can handle all the procedures mentioned in the introductory part depending on the configuration in which it is temporarily placed (for example by a microcontroller).

The device according to the invention can comprise other features which can be taken separately or in combination, and notably:

its encoder can comprise a laser configured to generate photons and a modulator configured to act on the generated photons in order to modulate their amplitude;

its encoder can be configured to generate each photon having a first fixed quantum state (dependent on the hardware used) from an electrical signal received during a time interval of a predefined duration and subdivided into first and second subintervals of predefined durations. In this case, the modulator can be configured to impose a zero modulation amplitude throughout the duration of each time interval except during first and second predefined instants belonging respectively to the first and second subintervals and during which the modulation amplitude is chosen so that an average amplitude is obtained over all of the time interval corresponding to the generation of a single photon having a first quantum state;

the modulator can be associated with an optical attenuator;

its transformer can comprise a phase modulator configured to transform a phase associated with the first quantum state of a photon into another phase associated with the second quantum state of the same photon;

the phase modulator can be configured to induce, between the first and second predefined time subintervals, at least one zero phase difference for a second quantum state corresponding to a first quantum information unit (or qubit) $|0\rangle$, or to at least one phase difference equal to a for a second quantum state corresponding to a second quantum information unit (or qubit) $|1\rangle$;

its decoder can comprise an interferometer configured to receive each photon having the second quantum state and comprising two inputs and two outputs and configured so that the output of a photon is determined by the phase difference between the two inputs, and a single-photon detector coupled to at least one of the two outputs of the interferometer;

the interferometer can comprise first and second optical beam splitters coupled to one another by first and second optical fibers respectively having first and second different lengths;

the difference between the first and second lengths can be equal to a distance travelled by a photon during the predefined duration of a time interval;

the interferometer can be coupled to the single-photon detector via a third optical beam splitter linked to the interferometer by third and fourth optical fibers respectively having third and fourth different lengths and configured to deliver a combination of optical signals delivered on the two outputs of the same optical beam splitter of the interferometer;

the difference between the third and fourth lengths can be equal to a distance travelled by a photon during the predefined duration of a time subinterval.

The invention also proposes a configuration method comprising a step in which a processing device of the type of that presented hereinabove is configured so that:

either the output of its encoder is coupled to the input of its transformer and the output thereof is coupled to the input of its decoder, for it to perform a procedure of prepare and measure type, or the output of its encoder is coupled to the input of its transformer and the output thereof is coupled to the input of its output interface, for it to perform a procedure of prepare and send type, or the output of its input interface is coupled to the input of its transformer and the output thereof is coupled to the input of its decoder, for it to perform a procedure of receive and measure type, or the output of its input interface is coupled to the input of its transformer and the output thereof is coupled to the input of its output interface, for it to perform a procedure of receive and send type.

The invention also proposes a method intended to distribute a quantum key and comprising:

a first step in which i) a processing device of the type of that presented hereinabove is configured so that its switch couples its encoder to the input of its transformer and the output thereof to the input of its decoder, ii) the encoder is configured so that it delivers 2N photons having first states corresponding respectively to 2N quantum information units, iii) the transformer is configured so that it transforms the first state of each photon, received from the encoder via the switch, into a second quantum state resulting from a uniform superimposition of first $|0\rangle$ and second $|1\rangle$ quantum information units corresponding to a phase difference of $\pi/2$, and iv) the decoder is used, with the 2N photons received from the transformer via the switch, to determine a sequence of 2N electrical signals each corresponding to a value chosen from 0 and 1, this sequence being subdivided into two subsequences of N electrical signals respectively denoted xi and yi (with i=1 to N), and a second step in which i) the processing device is configured so that its switch couples the output of its encoder to the input of its transformer and the output thereof to the input of its output interface, ii) the encoder is supplied with N electrical signals in order for it to generate, from these N electrical signals, a sequence of N photons each having a first fixed quantum state, and the transformer is supplied with the two subsequences xi and yi so that it transforms the first quantum state of each of the N photons, received from the encoder via the switch, into a second quantum state defined by a superimposition of the first $|0\rangle$ and second $|1\rangle$ quantum information units corresponding to a phase difference which is a function of the values of these xi and yi, with a view to its transmission by the output interface.

For example, in its second step, the encoder can be supplied with the two subsequences of N electrical signals in order for it to generate, from each pair (i) of electrical signals xi and yi, a photon having a first quantum state corresponding either to the first quantum information unit $|0\rangle$ corresponding to a phase difference of 0 in the presence of two electrical signals xi=0 and yi=0, or to the second quantum information unit $|1\rangle$ corresponding to a phase difference of x in the presence of two electrical signals xi=0 and yi=1, or to a uniform superimposition of the first $|0\rangle$ and second $|1\rangle$ quantum information units corresponding to a phase difference of $+\pi/2$ in the presence of two electrical signals xi=1 and yi=0, or even to another uniform superimposition of the first $|0\rangle$ and second $|1\rangle$ quantum information units corresponding to a phase difference of $-\pi/2$ in the presence of two electrical signals xi=1 and yi=1.

BRIEF DESCRIPTION OF THE FIGURES

Other features and advantages of the invention will become apparent on examining the following detailed description, and the attached drawings, in which.

DETAILED DESCRIPTION OF EXEMPLARY EMBODIMENTS

Figure 1:
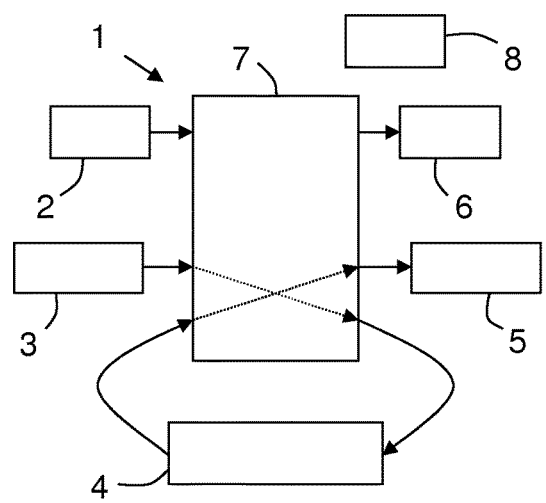
FIG. 1 schematically and functionally illustrates a first exemplary embodiment of a processing device according to the invention placed in a first configuration, FIG. 2 schematically and functionally illustrates the processing device of FIG. 1 placed in a second configuration, FIG. 3 schematically and functionally illustrates the processing device of FIG. 1 placed in a third configuration, FIG. 4 schematically and functionally illustrates the processing device of FIG. 1 placed in a fourth configuration, FIG. 5 schematically and functionally illustrates an exemplary embodiment of a decoder of a processing device according to the invention, and FIG. 6 schematically and functionally illustrates a second exemplary embodiment of a processing device according to the invention placed in a first configuration.

The aim of the invention is notably to propose a processing device 1 that can be configured according to the requirements and responsible for processing photons and electrical signals during quantum communications.

Hereinbelow, as a nonlimiting example, it will be considered that the processing device 1 is intended to form part of a quantum communication network comprising, for example, quantum computers. However, the invention is not limited to that application. Indeed, the processing device 1 can form part of, or be coupled to, numerous equipment items of a communication network comprising at least one quantum portion, and notably one or more conventional computers or other equipment items responsible for transferring quantum information encoded in photons.

FIGS. 1 to 4 schematically represent a nonlimiting exemplary embodiment of a processing device 1 according to the invention (placed in four different configurations).

As illustrated, a processing device 1, according to the invention, comprises at least an input interface 2, an encoder 3, a transformer 4, a decoder 5, an output interface 6 and a switch 7.

The input interface 2 is configured so as to receive photons having first quantum states. For this, it is, for example, connected to an optical fiber of a communication network or to a device that makes it possible to convert the memory of a quantum computer into a quantum property of a photon. Moreover, the output of this input interface 2 is coupled to an input of the switch 7.

It is recalled that a quantum state corresponds to a quantum information unit (or qubit), denoted $|0\rangle$ or $|1\rangle$, or to a superimposition of two different quantum information units, such as, for example, $1/\sqrt{2}(|0\rangle+|1\rangle)$ or $1/\sqrt{2}(|0\rangle-|1\rangle)$.

It will be noted that this input interface 2 can possibly comprise several (at least two) selectable inputs and/or several (at least two) selectable outputs.

The encoder 3 is configured so as to generate a photon having a first fixed quantum state from a received electrical signal. This first quantum state can, for example, be fixed by the hardware used. The output of this encoder 3 is coupled to an input of the switch 7.

For example, this encoder 3 can comprise a laser generating photons, and a modulator acting on the photons generated by the laser in order to modulate their amplitude. As an example, the laser can generate photons having a wavelength equal to 1550 nm and an energy of approximately 0.8 eV. Such a laser can, for example, be of so-called "continuous wave" type.

The encoder 3 can, for example, generate a photon having a first fixed quantum state from an electrical signal received during a time interval IT of a predefined duration dpt and subdivided into first SI1 and second SI2 subintervals of respective predefined durations dp1 and dp2, i.e. dpt=dp1+dp2. Preferably, dp1=dp2, but that is not mandatory. The modulator then imposes a zero modulation amplitude throughout the duration dpt of each time interval IT except during the first ip1 and second ip2 predefined instants belonging respectively to the first SI1 and second SI2 subintervals. During these first ip1 and second ip2 instants, the modulation amplitude is chosen (non-zero) so as to obtain an average amplitude over all the time interval IT which corresponds to the generation of a single photon having a first fixed quantum state. The abovementioned microcontroller 8 is therefore responsible for switching on and switching off the laser, and for supplying the amplitude modulator with the electrical signal that makes it possible to obtain the appropriate amplitude during the first ip1 and second ip2 instants of each time interval IT.

For example, the duration dpt of each time interval IT can be equal to 20 ns, and the durations dp1 and dp2 of the first SI1 and second SI2 subintervals can be equal to 10 ns. If a time interval IT begins at an instant t0, the first ip1 and second ip2 predefined instants can, for example, occur respectively at t0+5 ns and t0+15 ns. Also for example, the duration of each of the first ip1 and second ip2 instants can, for example, be equal to 100 ps. In this case, the amplitude of the optical signal is non-zero during the 100 ps of duration of each of the first ip1 and second ip2 instants, and this amplitude is chosen such that the average amplitude over the 20 ns of duration of the time interval IT concerned produces only a single photon (here of an energy of approximately 0.8 eV). It will be understood that each photon is thus located temporally in a time interval IT by superimposition of "contributions" (or optical signals) lying within the first SI1 and second SI2 subintervals.

As an example, the modulator of the encoder 3 can be associated with an optical attenuator (or optical signal attenuator). That makes it possible in fact to reduce the optical power of the optical signal from the laser, because, the smaller the optical power received by the modulator, the easier it is to perform the modulation.

The transformer 4 is configured so as to transform the first fixed quantum state of a photon into a second quantum state. The input of this transformer 4 is coupled to an output of the switch 7, and the output of this transformer 4 is coupled to an input of the switch 7.

The choice of this second quantum state can, for example, be made by a microcontroller which possibly forms part of the device 1. This choice is defined by an electrical signal which is communicated to the transformer 4.

For example, this transformer 4 can comprise a phase modulator configured so as to transform the phase which is associated with the first fixed quantum state of a received photon into another phase which is associated with the second quantum state. It will be noted that, in some cases, the first and second quantum states can be identical and in this case the phase of the photon is unchanged by the transformer 4.

The phase modulator can, for example, include, between the first SI1 and second SI2 predefined time subintervals, at least one zero (0) phase difference for a second quantum state which corresponds to a first quantum information unit (or qubit)|0⟩, or to at least a phase difference equal to π for a second quantum state which corresponds to a second quantum information unit (or qubit) |1⟩. It can also be configured so as to induce at least one phase difference different from 0 and from π in the case of superimpositions of the first |0⟩ and second |1⟩ quantum information units, such as, for example, +π/2 for $1/\sqrt{2}(|0⟩+|1⟩)$ or −π/2 for $1/\sqrt{2}(|0⟩−|1⟩)$.

When each time interval IT is subdivided into first SI1 and second SI2 subintervals, the abovementioned phase difference is the difference between the phase applied during the first subinterval SI1 and the phase applied during the second subinterval SI2. To this end, it is possible to use a phase modulator capable of changing, possibly, phase every 10 ns.

It is important to note that the phase is understood relative to the phase of the signal at the instant t0 (for the first subinterval SI1) and at the instant t0+dp1 (for the second subinterval SI2).

The abovementioned microcontroller 8 is responsible for supplying the phase modulator with the electrical signal which is necessary for the requested phase changes.

The decoder 5 is configured so as to transform the second quantum state of a received photon into an electrical signal which can be used by an item of equipment (remote or not). For example, each electrical signal can be read and processed by a microcontroller which is possibly the same (8) as that which is coupled to the encoder 3 and/or to the transformer 4. The input of this decoder 5 is coupled to an output of the switch 7.

Figure 5:
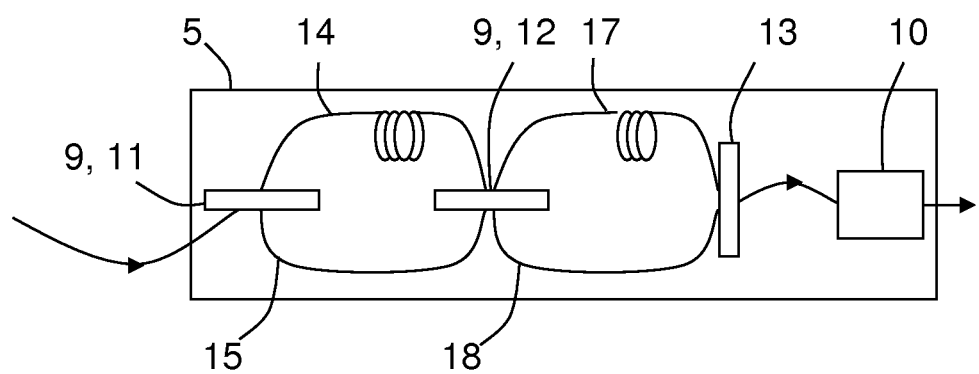

For example, and as illustrated in a nonlimiting manner in FIG. 5, this decoder 5 can comprise an interferometer 9 which receives each photon having a second quantum state and which comprises two inputs and two outputs and is configured so that the output of a photon is determined by the phase difference between these two inputs, and at least one single-photon detector 10 coupled to at least one of the two outputs of this interferometer 9.

Also as illustrated in a nonlimiting manner in FIG. 5, this interferometer 9 can comprise first 11 and second 12 optical beam splitters coupled to one another by first 14 and second 15 optical fibers. The first optical beam splitter 11 comprises an "input", and two "outputs" connected respectively to the first 14 and second 15 optical fibers. The second optical beam splitter 12 comprises two "inputs" connected respectively to the first 14 and second 15 optical fibers, and two "outputs".

The first 14 and second 15 optical fibers have, respectively, different first 11 and second 12 lengths.

For example, the first optical beam splitter 11 can be a semi-reflecting mirror. Likewise, the second optical beam splitter 12 can be a semi-reflecting mirror.

The interferometer 9 constitutes a variant of a Mach-Zehnder interferometer which operates even with a single photon.

Preferably, the difference between the first 11 and second 12 lengths is equal to the distance which is travelled by a photon in an optical fiber 14 or 15 during the predefined duration dp1 of a time subinterval SIT. Typically, when the predefined duration dp1 is equal to 20 ns, the difference between the first 11 and second 12 lengths is equal to approximately 4 m.

As illustrated in a nonlimiting manner in FIG. 5, the interferometer 9 can be coupled to the single-photon detector 10 via a third optical beam splitter 13. The latter (13) is then linked to the interferometer 9 (and more specifically to the two outputs of the second optical beam splitter 12) by third 17 and fourth 18 optical fibers respectively having third and fourth different lengths, respectively 13 and 14. This third optical beam splitter 13 comprises an output coupled to an input of the detector 10 and delivering a combination of the optical signals which are delivered on the two outputs of the second optical beam splitter 12 of the interferometer 9. Preferably, the difference between third 13 and fourth 14 lengths is equal to the distance which is travelled by a photon during the predefined duration dp1 of a time subinterval SI1.

For example, the third optical beam splitter 13 can be a semi-reflecting mirror.

With the arrangement illustrated and described, the first optical beam splitter 11 superimposes the photon entering on the first 14 and second 15 optical fibers and the second optical beam splitter 12 produces the interference between the two superimpositions of the single photon. The optical signals present on the two outputs of the second optical beam splitter 12 are then recombined using the third optical beam splitter 13. Ultimately, if the phase is the same in the first SI1 and second SI2 subintervals of the time interval IT considered, then, at the output of the interferometer 9, the photon is located in the first subinterval SI1. On the other hand, if the phase differs by between the first SI1 and second SI2 subintervals of the time interval IT considered, then, at the output of the interferometer 9, the photon is located in the second subinterval SI2. The single-photon detector 10, situated at the output of the interferometer, will detect the time interval IT in which the photon leaving the interferometer 9 is located and assign the value 0 to this photon if it is located in the first subinterval SI and the value 1 to this photon if it is located in the second subinterval SI2, for example. The microcontroller 8 then recovers the data from the single-photon detector 10 in order to assign the value 0 or the value 1 to each time interval IT.

In a variant embodiment, in the absence of a third optical beam splitter 13, a single-photon detector 10 can be coupled to each of the two outputs of the second optical beam splitter 12, and whether the photon has taken the first or the second output is thus detected. A phase difference is thus transformed into a position difference. That is particularly simple, but that necessitates the use of two single-photon detectors or else (as a variant) one detector with two inputs.

It will be noted that the single-photon detector has only a single purpose, namely to transmit an electrical signal at the moment when it detects a photon.

The output interface 6 is configured so as to deliver photons having second quantum states and which must be transmitted, for example over an optical fiber of a communication network or a circuit making it possible to transfer the state of the photon to the memory of a quantum computer. The input of this output interface 6 is coupled to an output of the switch 7.

The switch 7 comprises at least three inputs connected respectively to the outputs of the input interface 2, encoder 3 and transformer 4, and at least three outputs respectively connected to the inputs of the output interface 6, decoder 5 and transformer 4, and is configured so as to selectively couple at least one of its inputs to one of its outputs according to a received command. For example, this command can originate from a microcontroller which is possibly the same (8) as that which is coupled to the encoder 3 and/or to the transformer 4 and/or to the decoder 5.

As non-limiting examples, the switch 7 can be that which is manufactured by SERCALO under the reference SL8×8 ("latching fiber optic N×M matrix switch") or by DiCon Fiberoptics under the reference scd0129 ("MEMS Modular Single-Mode Matrix Optical Switch").

There is thus a single processing device 1 which can very advantageously handle at least all the procedures mentioned in the introductory part depending on the configuration in which it is temporarily placed, for example by the microcontroller 8. It is recalled that the procedures mentioned previously are the procedure of "prepare and measure" type, the procedure of "prepare and send" type, the procedure of "receive and measure" type, and the procedure of "receive and send" type.

In FIG. 1, there is illustrated an exemplary processing device 1 placed in a first configuration dedicated to the procedure of "prepare and measure" type. Here, the switch 7 couples the output of the encoder 3 to the input of the transformer 4 and the output of the transformer 4 to the input of the decoder 5. Thus, the encoder 3 generates a photon having a first fixed quantum state from each electrical signal received, the transformer 4 transforms the first quantum state of a photon from the encoder 3 into a second quantum state, and the decoder 5 transforms the second quantum state of a photon from the transformer 4 into an electrical signal that can be used by an item of equipment (remote or not). This procedure can, for example, be used to create random number sequences.

Figure 2:
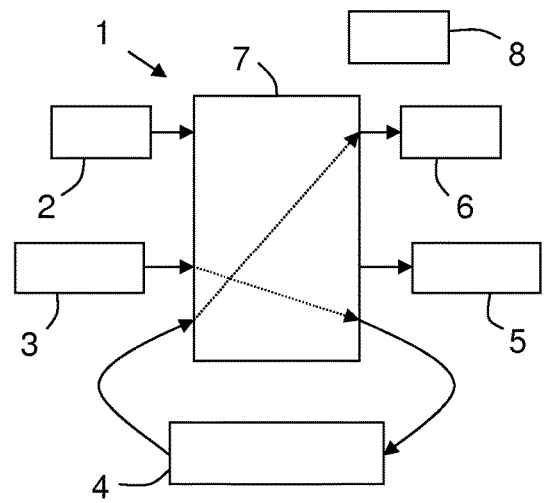

In FIG. 2, there is illustrated the same exemplary processing device 1 as that of FIG. 1, but this time placed in a second configuration dedicated to the procedure of "prepare and send" type. Here, the switch 7 couples the output of the encoder 3 to the input of the transformer 4 and the output of the transformer 4 to the input of the output interface 6. Thus, the encoder 3 generates a photon having a first fixed quantum state from each electrical signal received, the transformer 4 transforms the first quantum state of a photon from the encoder 3 into a second quantum state, and the output interface 6 delivers the photons having second quantum states and from the transformer 4 with a view to their transmission, for example over an optical fiber of a communication network or a quantum circuit of a quantum computer. This procedure can, for example, be used to transmit the information necessary to create a quantum key shared with at least one remote equipment item.

Figure 3:
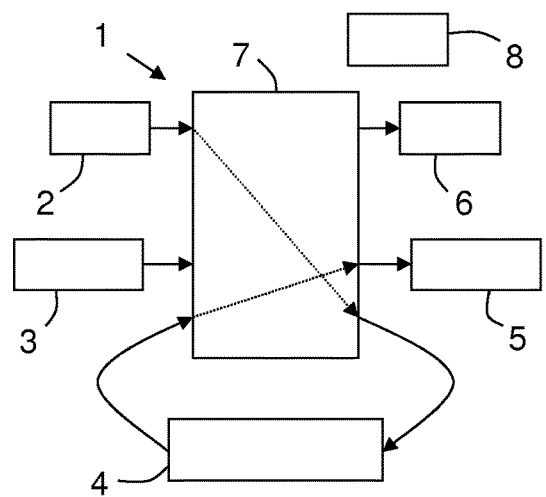

In FIG. 3, there is illustrated the same exemplary processing device 1 as that of FIG. 1, but this time placed in a third configuration dedicated to the procedure of "receive and measure" type. Here, the switch 7 couples the output of the input interface 2 to the input of the transformer 4 and the output of the transformer 4 to the input of the decoder 5. Thus, the input interface 2 receives photons having first quantum states, for example from an optical fiber of a communication network or from a quantum circuit of a quantum computer, the transformer 4 transforms the first quantum state of a photon from the input interface 2 into a second quantum state, and the decoder 5 transforms the second quantum state of a photon from the transformer 4 into an electrical signal that can be used by an equipment item (remote or not). This procedure can, for example, be used to receive the information necessary to create a quantum key shared with a remote equipment item.

Figure 4:
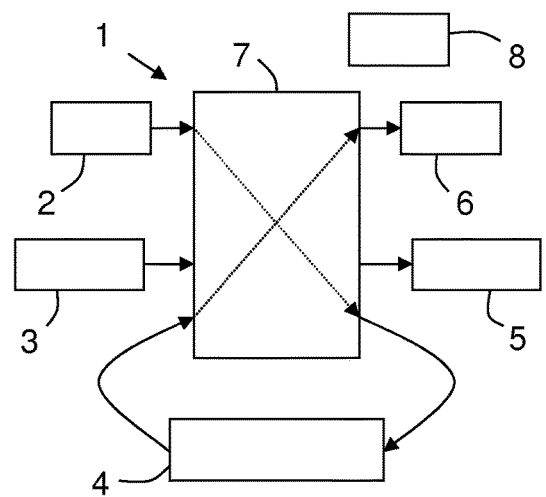

In FIG. 4, there is illustrated the same exemplary processing device 1 as that of FIG. 1, but this time placed in a fourth configuration dedicated to the procedure of "receive and send" type. Here, the switch 7 couples the output of the input interface 2 to the input of the transformer 4 and the output of the transformer 4 to the input of the output interface 6. Thus, the input interface 2 receives photons having first quantum states, for example from an optical fiber of a communication network or from a circuit making it possible to transfer the state of the photon to the memory of a quantum computer, the transformer 4 transforms the first quantum state of a photon from the input interface 2 into a second quantum state, and the output interface 6 delivers the photons having second quantum states and from the transformer 4 with a view to their transmission, for example over an optical fiber of a communication network or a quantum circuit of a circuit making it possible to transfer the state of the photon to the memory of a quantum computer. This procedure can, for example, be used by advanced quantum cryptography protocols, for example when the communication has to perform several consecutive round trips between equipment items or when there are more than two participating equipment items.

It will be noted that one embodiment of the invention also proposes a configuration method comprising a step in which the processing device 1 is configured so that:

either the output of its encoder 3 is coupled to the input of its transformer 4 and the output thereof (4) is coupled to the input of its decoder 5 for it to perform a procedure of "prepare and measure" type, or the output of its encoder 3 is coupled to the input of its transformer 4 and the output thereof (4) is coupled to the input of its output interface 6, for it to perform a procedure of "prepare and send" type, or the output of its input interface 2 is coupled to the input of its transformer 4 and the output thereof (4) is coupled to the input of its decoder 5, for it to perform a procedure of "receive and measure" type, or the output of its input interface 2 is coupled to the input of its transformer 4 and the output thereof (4) is coupled to the input of its output interface 6, for it to perform a procedure of "receive and send" type.

It will also be noted that an embodiment of the invention also proposes a method intended to allow the distribution of a quantum key, and comprising first and second steps that can be implemented at least by the processing device 1 described above.

In this first step of the method:

the processing device 1 is configured so that its switch 7 couples the output of its encoder 3 to the input of its transformer 4 and the output thereof (4) to the input of its decoder 5. The processing device 1 is therefore placed in its first configuration dedicated to the procedure of "prepare and measure" type, the encoder 3 is configured so that it delivers 2N photons having first states corresponding respectively to the 2N quantum information units (or qubits), the transformer 4 is configured so that it transforms the first state of each photon, received from the encoder 3 via the switch 7, into a second quantum state resulting from a uniform superimposition of the first |0⟩ and second |1⟩ quantum information units which corresponds to a phase difference of $\pi/2$ ($1/\sqrt{2}(|0\rangle+|1\rangle)$), and the decoder 5, with these 2N photons received from the transformer 4 via the switch 7, is used to determine a sequence of 2N electrical signals which each correspond to a value chosen from 0 and 1, this sequence being subdivided into two subsequences of N electrical signal respectively denoted xi and yi, with i=1 to N. The first subsequence is therefore (x1, x2, . . . , xN) and the second subsequence is (y1, y2, . . . , yN). The subdivision into two subsequences xi and yi is, for example, performed by the microcontroller 8 in order for each pair (consisting of the two elements i of the sequences xi and yi) to determine the state of a photon to be transmitted.

In the second step of the method:

the processing device 1 is configured so that its switch 7 couples the output of its encoder 3 to the input of its transformer 4 and the output thereof (4) to the input of its output interface 6. The processing device 1 is therefore placed in its first configuration dedicated to the procedure of "prepare and send" type, the encoder 3 is supplied with N electrical signal in order for it to generate, from these N electrical signals, a sequence of N photons each having a first fixed quantum state, and the transformer 4 is supplied with the two subsequences of N electrical signals (x1, x2, . . . , xN) and (y1, y2, . . . , yN) so that it transforms the first quantum state of each of the N photons, received from the encoder 3 via the switch 7, into a second quantum state defined by a superimposition of the first $|0\rangle$ and second $|1\rangle$ quantum information units corresponding to a phase difference which is a function of the values of these xi and yi, with a view to the transmission of this photon by the output interface 6.

Thus, a random sequence of N qubits defined respectively by the N photons transformed by the transformer 4 and defining a quantum key is generated, and this quantum key is transmitted via the output interface 6 to an equipment item (remote or not).

For example, in the second step of the method, it is possible to supply the transformer 4 with the two subsequences of N electrical signals (x1, x2, . . . , xN) and (y1, y2, . . . , yN) in order for it to transform, from each pair (i) of electrical signals xi and yi, a photon having a first fixed quantum state into a second quantum state corresponding:

either to the first quantum information unit $|0\rangle$ corresponding to a phase difference of 0 when it is in the presence of two electrical signals xi=0 and yi=0, or to the second quantum information unit $|1\rangle$ corresponding to a phase difference of when it is in the presence of two electrical signals xi=0 and yi=1, or to a uniform superimposition of the first $|0\rangle$ and second $|1\rangle$ quantum information units corresponding to a phase difference of $\pi/2$ (second state $1/\sqrt{2}(|0\rangle+|1\rangle)$) when it is in the presence of two electrical signals xi=1 and yi=0, or even to another uniform superimposition of the first $|0\rangle$ and second $|1\rangle$ quantum information units corresponding to a phase difference of $-\pi/2$ (second state $1/\sqrt{2}(|0\rangle-|1\rangle)$) when it is in the presence of two electrical signals xi=1 and yi=1.

The encoder 3 is informed of the values xi and yi, of the electrical signals whose encoding has given the pair of photons to be transformed, by a microcontroller which is possibly the same (8) as that which is coupled to the decoder 5.

The invention makes it possible to implement other procedures involved in quantum communications. One of these procedures is described hereinbelow.

In this procedure, one participant (hereinafter called Alice) acts on the quantum state of a photon which has been transmitted according to its internal state, but also according to the result of the execution of a digital communication protocol (for example according to a communication standard such as ISO/IEC 8802-3 or IEEE 802.11) with another participant to this procedure (hereinafter called Bob). This is therefore the case of a hybrid digital/quantum communication. When the digital communication takes place after the quantum communication, it is necessary to store the quantum state. The object of this procedure is therefore to store the quantum state of a photon without using quantum memory, which amounts to saving this quantum state in order to restore it on demand.

Figure 6:
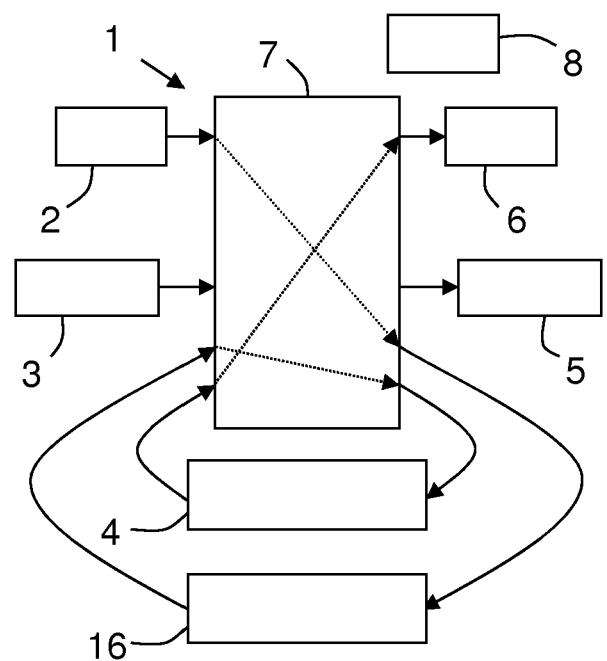

In order to be able to process in parallel the quantum communication and the digital communication, it is preferable to add to the processing device 1 (illustrated in FIGS. 1 to 4) an item of equipment 16 that introduces a programmable delay (or retard). As illustrated in a nonlimiting manner in FIG. 6, this equipment item 16 comprises an input coupled to an output of the switch 7, and an output coupled to an input of the switch 7.

For example, this equipment item 16 can comprise a set of optical fibers of different lengths that can be coupled to one another or used separately by programming via an electronic interface, in order to selectively define the overall length that the photons will have to travel. Thus, it is possible to program in advance the time taken by a photon to travel this overall length of optical fiber.

From the Alice point of view, for the procedure of "receive and measure" type, the sequence of operations performed is as follows:

Alice sends a digital test message to Bob and measures the time t needed to receive his response, Alice tells Bob that she is ready to initiate the quantum communication. For example, she programs a delay of the equipment item 16 of a duration equal to 1.5 t, Bob sends a quantum message to Alice, Alice places the quantum message in the equipment item 16 and initiates the digital communication, at the end of this digital communication, Alice performs the programming of the transformer 4 via the microcontroller 8 which has received the digital communication, the quantum message is then output from the equipment item 16, passes into the transformer 4 where it is transformed, and the procedure continues with the transmission to Bob of the transformed quantum message via the output interface 6 or with the measurement of the transformed quantum message by the decoder 5.

It will also be noted that the storage of the photons can be performed without quantum memory, simply by using a programmable delay. That results from the fact that the second step of the protocol makes it possible to measure the time t for a communication round, and therefore that the qubits can be stored for a time for example equal to a multiple of t for safety. As an example, this storage time can be chosen equal to 2t by configuration.

An example of a set of elements performing such a photon storage function without quantum memory is described in the patent document U.S. Pat. No. 6,718,080. Such a set of elements is for example marketed by General Photonics under the name ODG and is currently described at the Internet address http://www.generalphotonics.com/index.php/product/programmable-optical-delay/. It is also marketed by Optivia under the name OTS-ODLS-I-40, currently being described at the Internet address http://www.jencotech.com/cms/resources/optivaotsodlsi40ghz.pdf.

The functions of the different elements illustrated in the figures can be performed by means of dedicated electrical or electronic components (or "hardware") or capable of executing commands and/or instructions of software modules (or "software") in combination with software modules adapted to this end.

The person skilled in the art will understand that the various functional schemes illustrated represent conceptual views of circuitry implementing the principles of the invention.

The description and the drawings illustrate only the principles of the invention. Consequently, the person skilled in the art will be able to devise variant arrangements which, although not explicitly described or illustrated, implement the principles of the invention and are therefore included within the spirit and the scope thereof. Moreover, all the examples which are mentioned here have a primarily teaching purpose in order to assist the reader in understanding the principles of the invention and the concepts that make up the contributions of the inventors to the technical field concerned, and should not be considered here to be limiting as the only exemplary implementations of the invention. In addition, all the statements which here relate to the principles, aspects and embodiments of the invention, and the specific examples thereof, are intended to encompass the equivalents of this invention.

The invention claimed is:

1. A processing device (1) comprising i) an input interface (2) configured to receive photons having first quantum states, ii) an encoder (3) configured to generate a photon having a first fixed quantum state from a received electrical signal, iii) a transformer (4) configured to transform said first quantum state of a photon into a second quantum state, iv) a decoder (5) configured to transform said second quantum state of a received photon into an electrical signal, and v) an output interface (6) configured to deliver photons having second quantum states and to be transmitted, said processing device (1) also comprising a switch (7) comprising at least three inputs connected respectively to outputs of said input interface (2), encoder (3) and transformer (4), and at least three outputs connected respectively to inputs of said output interface (6), decoder (5) and transformer (4), and selectively coupling at least one of its inputs to one of its outputs according to a received command.

2. The device as claimed in claim 1, wherein said encoder (3) comprises a laser configured to generate photons and a modulator configured to act on said generated photons in order to modulate their amplitude.

3. The device as claimed in claim 2, wherein said encoder (3) is configured to generate a photon having a first fixed quantum state from each electrical signal received during a time interval of a predefined duration and subdivided into first and second subintervals of predefined durations, and in that said modulator is configured to impose a zero modulation amplitude throughout the duration of each time interval except during first and second predefined instants belonging respectively to said first and second subintervals and during which said modulation amplitude is chosen so that an average amplitude is obtained over all of said time interval corresponding to the generation of a single photon having a first quantum state.

4. The device as claimed in claim 2, wherein said modulator is associated with an optical attenuator.

5. The device as claimed in claim 1, wherein said transformer (4) comprises a phase modulator configured to transform a phase associated with said first quantum state of a photon into another phase associated with said second quantum state of this same photon.

6. The device as claimed in claim 5, wherein said phase modulator is configured to induce, between said first and second predefined time subintervals, at least one zero phase difference for a second quantum state corresponding to a first quantum information unit |0⟩, or at least one phase difference equal to $\pi$ for a second quantum state corresponding to a second quantum information unit |1⟩.

7. The device as claimed in claim 1, wherein said decoder (5) comprises an interferometer (9) configured to receive each photon having said second quantum state and comprising two inputs and two outputs and configured so that the output of a photon is determined by the phase difference between the two inputs, and a single-photon detector (10) coupled to at least one of said two outputs of said interferometer (9).

8. The device as claimed in claim 7, wherein said interferometer (9) comprises first (11) and second (12) optical beam splitters coupled to one another by first (14) and second (15) optical fibers respectively having first and second different lengths.

9. The device as claimed in claim 8, wherein the difference between said first and second lengths is equal to a distance travelled by a photon during said predefined duration of a time interval.

10. The device as claimed in claim 8, wherein said interferometer (9) is coupled to said single-photon detector (10) via a third optical beam splitter (13) linked to said interferometer (9) by third (17) and fourth (18) optical fibers respectively having third and fourth different lengths and configured to deliver a combination of optical signals delivered on two outputs of said second optical beam splitter of the interferometer.

11. The device as claimed in claim 10, wherein the difference between said third and fourth lengths is equal to a distance travelled by a photon during the predefined duration of a time subinterval.

12. A configuration method for a processing device (1), the processing device (1) comprising i) an input interface (2) configured to receive photons having first quantum states, ii) an encoder (3) configured to generate a photon having a first fixed quantum state from a received electrical signal, iii) a transformer (4) configured to transform said first quantum state of a photon into a second quantum state, iv) a decoder (5) configured to transform said second quantum state of a received photon into an electrical signal, and v) an output interface (6) configured to deliver photons having second quantum states and to be transmitted, said processing device (1) also comprising a switch (7) comprising at least three inputs connected respectively to outputs of said input interface (2), encoder (3) and transformer (4), and at least three outputs connected respectively to inputs of said output interface (6), decoder (5) and transformer (4), and selectively coupling at least one of its inputs to one of its outputs according to a received command, the method comprising a step in which the processing device (1) is configured so that:
either the output of said encoder (3) is coupled to the input of said transformer (4) and the output thereof (4) is coupled to the input of said decoder (5), for it to perform a procedure of prepare and measure type,
or the output of said encoder (3) is coupled to the input of said transformer (4) and the output thereof (4) is coupled to the input of said output interface (6), for it to perform a procedure of prepare and send type,
or the output of said input interface (2) is coupled to the input of said transformer (4) and the output thereof (4) is coupled to the input of said decoder (5), for it to perform a procedure of receive and measure type,
or the output of said input interface (2) is coupled to the input of said transformer (4) and the output thereof (4) is coupled to the input of said output interface (6), for it to perform a procedure of receive and send type.

13. A method for distributing a quantum key using a processing device (1), the processing device comprising i) an input interface (2) configured to receive photons having first quantum states, ii) an encoder (3) configured to generate a photon having a first fixed quantum state from a received electrical signal, iii) a transformer (4) configured to transform said first quantum state of a photon into a second quantum state, iv) a decoder (5) configured to transform said second quantum state of a received photon into an electrical signal, and v) an output interface (6) configured to deliver photons having second quantum states and to be transmitted, said processing device (1) also comprising a switch (7) comprising at least three inputs connected respectively to outputs of said input interface (2), encoder (3) and transformer (4), and at least three outputs connected respectively to inputs of said output interface (6), decoder (5) and transformer (4), and selectively coupling at least one of its inputs to one of its outputs according to a received command, the method comprising:

a first step in which i) the processing device (1) is configured so that the output of said encoder (3) is coupled to the input of said transformer (4) and the output thereof (4) is coupled to the input of said decoder (5), ii) said encoder (3) is configured so that it delivers 2N photons having first states corresponding respectively to 2N quantum information units, iii) said transformer (4) is configured so that it transforms the first state of each photon, received from said encoder (3) via said switch (7), into a second quantum state resulting from a uniform superimposition of first $|0\rangle$ and second $|1\rangle$ quantum information units corresponding to a phase difference of $\pi/2$, and iv) said decoder (5) is used, with said 2N photons received from said transformer (4) via said switch (7) to determine a sequence of 2N electrical signals each corresponding to a value chosen from 0 and 1, this sequence being subdivided into two subsequences of N electrical signals respectively denoted xi and yi (with i=1 to N), and a second step in which i) said processing device (1) is configured so that the output of said encoder (3) is coupled to the input of said transformer (4) and the output thereof (4) is coupled to the input of said output interface (6), ii) said encoder (3) is supplied with N electrical signals in order for it to generate, from these N electrical signals, a sequence of N photons having a first fixed quantum state, and said transformer (4) is supplied with said two subsequences xi and yi so that it transforms the first quantum state of each photon, received from said encoder (3) via said switch (7), into a second quantum state defined by a superimposition of said first $|0\rangle$ and second $|1\rangle$ quantum information units corresponding to a phase difference which is a function of said values of these xi and yi, with a view to the transmission of this photon by said output interface (6).

14. The method as claimed in claim 13, wherein, in said second step, said encoder (3) is supplied with said two subsequences of N electrical signals in order for it to generate, from each pair (i) of electrical signals xi and yi, a photon having a first quantum state corresponding either to said first quantum information unit $|0\rangle$ corresponding to a phase difference of 0 in the presence of two electrical signals xi=0 and yi=0, or to the second quantum information unit $|1\rangle$ corresponding to a phase difference of $\pi$ in the presence of two electrical signals xi=0 and yi=1, or a uniform superimposition of said first $|0\rangle$ and second $|1\rangle$ quantum information units corresponding to a phase difference of $\pi/2$ in the presence of two electrical signals xi=1 and yi=0, or even to another uniform superimposition of said first $|0\rangle$ and second $|1\rangle$ quantum information units corresponding to a phase difference of $-\pi/2$ in the presence of two electrical signals xi=1 and yi=1.

* * * * *